United States Patent [19]

Mahler et al.

[11] Patent Number: 4,512,240
[45] Date of Patent: Apr. 23, 1985

[54] DOOR, PARTICULARLY FOR A CAR

[75] Inventors: Gert Mahler, Radevormwald; Heinz-Jürgen Falkenroth, Ennepetal; Wulf Leitermann, Wimpfen; Manfred Boms, Neckargerach, all of Fed. Rep. of Germany

[73] Assignee: Gebr. Happich GmbH, Fed. Rep. of Germany

[21] Appl. No.: 499,828

[22] Filed: Jun. 1, 1983

[30] Foreign Application Priority Data

Jun. 5, 1982 [DE] Fed. Rep. of Germany ....... 3221322

[51] Int. Cl.³ .............................................. B60H 1/26
[52] U.S. Cl. ........................................ 98/2.04; 49/503
[58] Field of Search .......................... 49/501, 502, 503; 98/2.04; 296/31 P, 146, 202, 208

[56] References Cited

U.S. PATENT DOCUMENTS

| 3,370,384 | 2/1968 | Hafer et al. | |
| 3,782,036 | 1/1974 | Clark et al. | 49/502 |
| 3,791,693 | 2/1974 | Hellriegel et al. | 49/503 |
| 3,964,208 | 6/1976 | Renner et al. | 49/502 |
| 4,306,381 | 12/1981 | Presto | 49/502 |
| 4,328,642 | 5/1982 | Presto | 49/502 |

FOREIGN PATENT DOCUMENTS

| 1655656 | 8/1971 | Fed. Rep. of Germany | 49/502 |
| 2127724 | 12/1972 | Fed. Rep. of Germany | |
| 2510220 | 9/1976 | Fed. Rep. of Germany | 296/146 |
| 3033692 | 4/1981 | Fed. Rep. of Germany | |
| 3039895 | 5/1981 | Fed. Rep. of Germany | |
| 3002134 | 7/1981 | Fed. Rep. of Germany | 98/2.04 |
| 3102328 | 8/1982 | Fed. Rep. of Germany | |
| 3102329 | 9/1982 | Fed. Rep. of Germany | |

Primary Examiner—Harold Joyce
Attorney, Agent, or Firm—Ostrolenk, Faber, Gerb & Soffen

[57] ABSTRACT

A door, particularly for a car, is a rigidified plastic unit. It comprises an integral plastic door inner part having a box-shaped lower part with an open side facing outwardly and having a window frame at the top thereof. There is a door outer part which is fitted over the open box-shaped inner part for closing off the same. Optionally, an H-shaped reinforcing element is disposed between the inner and outer parts, with two legs of the H extending partially through a U-shaped channel which shapes the upper part of the window frame. The window pane is part of the outer door part and may be integral therewith. An air duct may be defined in the door inner part or in the reinforcing element for blowing air over the window.

25 Claims, 5 Drawing Figures

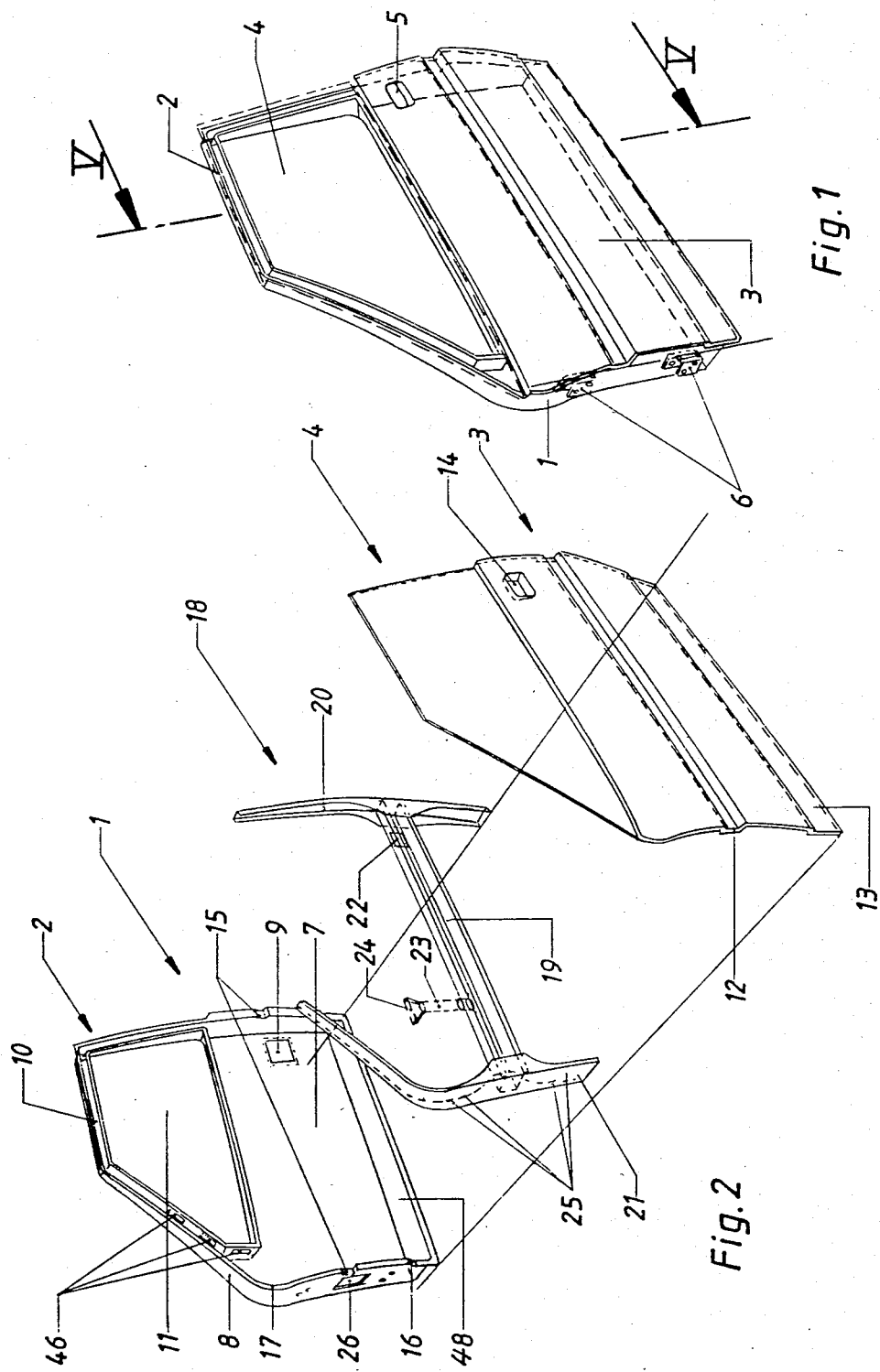

DOOR, PARTICULARLY FOR A CAR

BACKGROUND OF THE INVENTION

The present invention relates to a door for a vehicle, particularly a car door, which essentially comprises a door inner part and a door outer part, a window frame and a window pane.

Car doors generally are made of a door outer plate and a door inner plate, with an interposed steel-frame serving as the load-bearing part and also bearing the window frame and the window pane which is inserted therein. Such doors are rather heavy and expensive to manufacture and they have the further disadvantage that they are subject to a large amount of corrosion.

Doors of lighter weight plastic are known, as in U.S. Pat. Nos. 4,328,642 and 4,306,381. However, especially in the vicinity of the window and its frame, the plastic doors may not have adequate rigidity and strength.

SUMMARY OF THE INVENTION

The object of the present invention is to provide a door, particularly a car door, which has the lowest possible weight, a construction which consists of only a few individual parts, is simply and economically manufactured, has strength sufficient for the intended purposes of use, particularly torsional strength, has an esthetically pleasing shape, and has a styling which assures favorable coefficients of drag.

According to the invention, the inner part of the door comprises a box-shaped, lower part of plastic which is open on the side toward the outside of the door and comprises a window frame with a U-shaped cross-section which is open on the side toward the outside of the door also and which is integral with the lower part of the door inner part. Toward the outside of the door, the window is assembled to be rigid with the plastic outer part and with the window pane carried on the outer part. The inner and outer parts are assembled, preferably by bonding or welding. The window pane is rigidly fastened to the two arms of the window frame.

The inner part of the door has a box-like construction according to the invention. It is thus inherently relatively stable in shape and is adapted to assume the load-bearing function. The inner part of the door is preferably bonded or welded to the outer part of the door, whereby the dimensional stability of the door, particularly with respect to its torsional strength, is optimized. This is true also of the attachment of the window pane to the window frame. They are connected by application of the pane to the two arms of the window frame of U-shaped cross-section. This imparts strength, and particularly torsional strength to the window frame so that it is comparable to the strength of a closed box profile.

The door of the invention need merely comprise three main parts, namely, the load-bearing inner part of the door, the outer part of the door which covers and stiffens the inner part of the door, and the window pane. The parts of the door, possibly also including the window pane, are formed of dimensionally stable plastic which has been reinforced, possibly by fiberglass or the like. The door is, therefore, easy to manufacture, light in weight, resistant to corrosion and particularly easy to assemble by welding or bonding. Because the window pane is firmly arranged on the outside of the window frame, this provides the advantage of a firm, dimensionally stable, torsionally resistant sandwich construction. It also provides a particularly favorable coefficient of drag, since there need be no window frame parts which protrude toward the outside.

The inner part of the door can advantageously have a box shape, formed by a bent edge rim which extends around the outside of the inner part. By placing the outer part of the door against this rim and connecting the outer part in a material-locked manner to the rim, the door can be rapidly and simply produced.

In one preferred embodiment, the inner part of the door with the window frame is a single-wall plastic molding. The window frame has an approximately U-shaped cross-section with a channel which is open toward the outer side of the door inner part and perpendicular to the plane of the door. The channel continues peripherally over the edge region of the inner part of the door and is in open communication with a correspondingly shaped channel extending forward and rearward and approximately in the center of the door.

The door outer part is a plastic molded part which also comprises a single wall together with the window pane. Selectively, the door outer part and window frame may be two parts or may be integrated. The outer part is assembled to the inner part of the door by approximately parallel application and, at least in the region of the window frame, it completely closes off the channel. This imparts to the inner part of the door a labyrinth-like development and stabilizes it in the longitudinal, transverse and diagonal directions.

In order to be able to develop both the inner and the outer parts of the door with relatively thin walls, without loss of stability, there is arranged between the outer part of the door and the inner part of the door a reinforcing element which may also extend at least partially into the channel of the window frame. The reinforcing element is preferably bonded to the inner part of the door and affords the advantage of mechanical and thermal stabilization of the door.

Additional expedients are provided for rigidifying the door and the door inner and outer parts. The lower part of the door, at the bottom, has a peripheral rim part which is bent toward the door outer part for helping to define the box shape of the lower part of the door and rigidifying the door. Furthermore, the peripheral edge of the inner part, at the side thereof facing toward the outer part, is bent to project outwardly, to define a peripheral surface to which the door outer part is bonded.

The reinforcing element may be generally H-shaped, with the cross arm of the H extending beneath the window frame, and with two side arms of the H extending partially through the U-shaped channel around the window frame. The H-shaped reinforcing element may have arms, each of which is U-shaped. The cross arm of the H-shaped element also has a U shape, where the U of the cross arm opens toward the door outer part. The door outer part has a corresponding depressed part for being received in this recess in the cross arm of the H. The door hinges and locks may be defined on the reinforcing element.

For simplicity, the door outer part may be integrated with the window and both could be comprised of the same material, such as a transparent, paintable plastic, so that the part of the door outer part beneath the window may be painted.

An air transmitting duct may be provided in the door, either by being defined in the door inner part or by being defined in the reinforcing element. Outlets are provided from the ducts for blowing against the window pane, either from beneath the window pane or even through part of the window frame.

Other objects and features of the invention are explained below, with reference to the accompanying drawings.

BRIEF DESCRIPTION OF THE DRAWINGS

FIG. 1 is a perspective view of a car door in accordance with the invention;

FIG. 2 is an exploded view of the door shown in FIG. 1;

DESCRIPTION OF THE PREFERRED EMBODIMENTS

Figure 3:
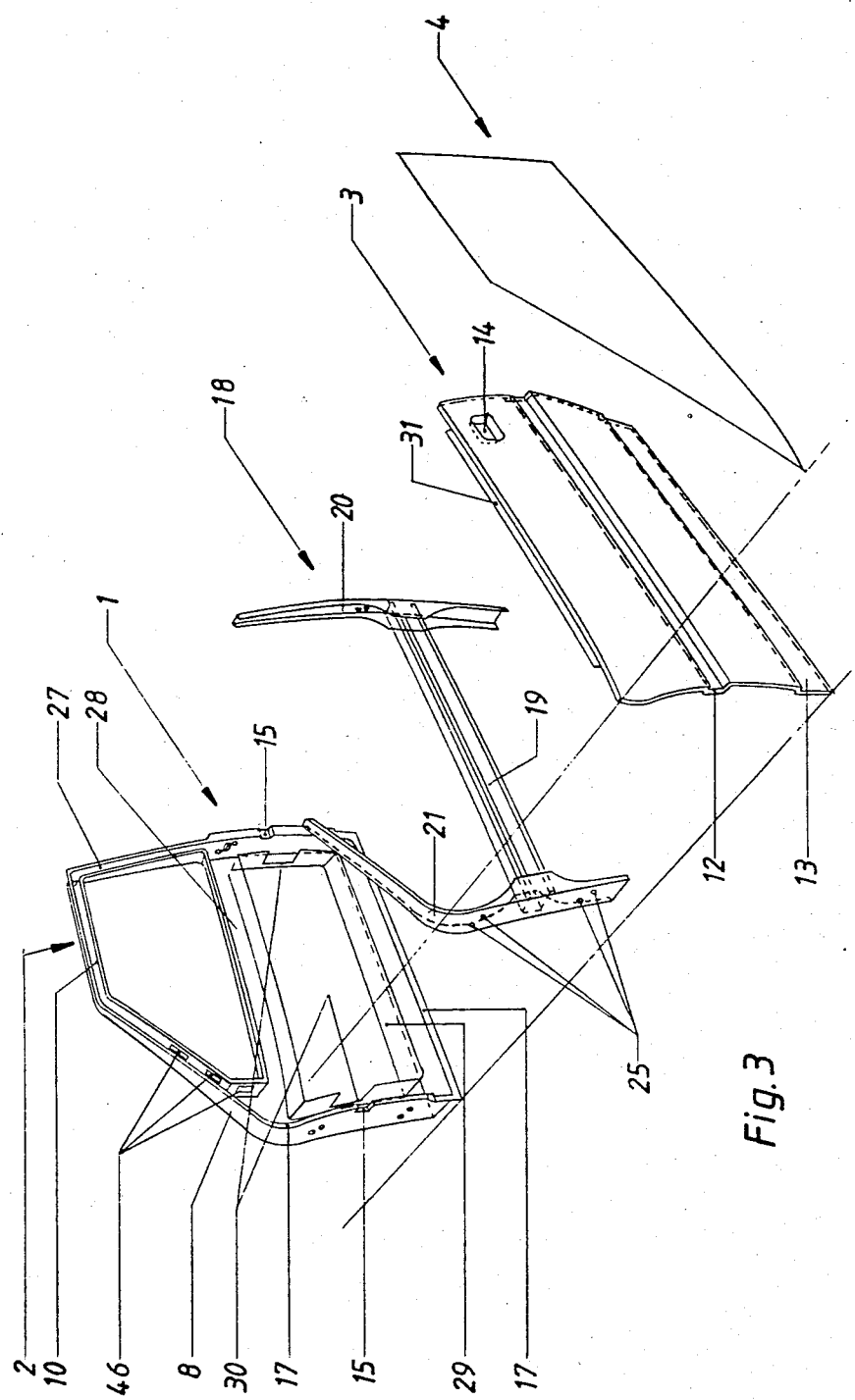
FIG. 3 is an exploded view of a modified door in accordance with the invention.

The car door shown in FIG. 1 comprises a load-bearing door inner part 1 made of plastic. That inner part is integral with a window frame 2. It is stiffened, particularly by being covered, on its outer side by the door outer part 3 and by a window pane 4. The door is provided with an ordinary lock 5, not shown in detail, and with door mounting swivel hinges 6 on one end surface.

FIG. 2 shows a first embodiment of the door in an exploded view. The inner part 1 of the door comprises a generally box-shaped door lower part 7 with a window frame 2 formed integrally on it. The box shape of the door lower part 7 is determined by a peripheral rim 8, which is bent off toward the outside. The bent rim 8 extends continuously around the entire door inner part 1. It, therefore, also participates in forming the window frame 2. The window frame has a U-shaped cross-sectional shape with arms of that U having equal length and with a channel opening which, in the same manner as the door lower part 7, is directed toward the outside. The inner arm 10 of the window frame 2 surrounds the window frame opening 11. In the bottom of the box-shaped door lower part 7, an outlet opening 9 is provided for fresh air or hot air.

There is a door outer part 3 which is developed integral with the window pane 4. Therefore, the entire outer part is comprised of a transparent but paintable plastic. In about the center of the door outer part 3, there is a groove 12 which extends over the entire width of that part and is deformed toward the inside of the door. At the lower end region of the door outer part 3, there is a continuously recessed rim 13. Finally, the door outer part 3 has an opening 14 for a door handle.

In its simplest form, the complete door consists merely of two parts, namely, the door inner part 1 with a window frame 2 developed integrally on it and the door outer part 3 with the window pane 4 developed integrally on it. Upon assembly of such a door, the door inner part 1 and the door outer part 3 are placed in coincidence against each other and are bonded or welded together at their edge. By welding, in particular, ultrasonic welding, is understood. Upon placement of the door outer part 3 on the door inner part 1, the groove 12 of the outer part engages in corresponding cutouts 15 and the rim 13 engages in a corresponding recess 16 at the rim 8 of the door inner part 1. In order to increase the surface of application between the inner and outer parts, the entire rim 8 around the periphery of the door inner part is developed with a short, outwardly directed peripheral flange 17 against which the door outer part and the window are bonded.

The door formed by assembly of the door inner part 1 to the door outer part 3 is stable and torsionally resistant as a result of the closed box construction. The stability and torsional resistance is also enhanced by the window pane 4 and its special attachment to the two arms 8 and 10 of the window frame 2.

It is advantageous for a preferably separate reinforcing element 18, as in FIG. 2, to be inserted into the box cavity of the door in order to provide thermal and mechanical reinforcement. A preferred embodiment of a reinforcing element 18 is of an H-shaped development and may be comprised of profiled steel plates, aluminum shapes or of a reinforced, and particularly fiberglass-reinforced, plastic. The approximately horizontally extending web 19 of the reinforcing element 18 has a U-shaped cross-section with the opening of the U directed toward the door outer part 3. The legs 20, 21 of the reinforcing element 18 also have respective U-shaped cross-sections. The open ends of the U's of the legs are directed toward each other. The web 19 is positioned intermediate the lengths of and is developed in one piece with the legs 20, 21 or the web is connected to them by welding or riveting. In one variant, the reinforcing element 18 may simultaneously serve as an air duct. For this purpose, the web 19 has an opening 22 at the level of the outlet opening 9 in the door inner part and has a tubular extension 23 having at least one slot nozzle 24 which is opposite a slot provided in the inner arm 10 of the window frame 2. Air enters via an inlet nozzle 26 in the front edge wall of the door inner part 1. The leg 21 of the reinforcing element 18 has holes 25 for attachment of the hinges 6. In its upper region, the leg 21 had a bend which is adapted to the contour of the window frame 2 in the front region of the door. The reinforcing element 18 is inserted into the box opening of the door inner part 1 and is preferably bonded to it. The regions of the legs 20, 21 located above the web 19 then sit in the window frame 2. Therefore, in addition to obtaining stabilization of the door lower part 1 by the element 18, stabilization of the window frame 2 is also obtained. Upon assembly of the door of FIG. 2, therefore, the reinforcing element 19 is first bonded to the door inner part 1 and the door outer part 3 is then bonded to said unit.

The second embodiment of a door shown in FIG. 3 has a door inner part 1 which together with the window frame 2 is a single-wall plastic molding. The window frame 2 has an approximately U-shaped cross-section with a channel 27 which opens outward, perpendicular to the plane of the door, and which continues peripherally over the edge region of the door inner part 1 and is in open communication with a correspondingly shaped transverse channel 28 at the bottom of the window frame. The door inner part 1 thus has three U-shaped cross-section, horizontally extending stiffenings which results in increased strength. A fourth horizontally extending stiffening formed by the web 19 of the reinforcing element 18 of the type described above, is also provided in the door of FIG. 3. The door is reinforced especially as the door outer part closes off these channels. For placing the reinforcing element 18 within the box-shaped contour of the door inner part 1, cutouts 30 are provided in the peripheral web 29 which on one side defines the channel 27 within the door lower part 7. The cutouts 30 are filled by the web 19. In the embodiment shown in FIG. 3, the window pane 4 is developed separately from the door outer part 3. The door outer part 3 is also developed with a depressed groove 12, a rearwardly recessed lower edge 13 and a door handle opening 14. It also has a flange 31 at its top end, against which the region of the lower edge of the window pane 4 rests and to which the window pane 4 is preferably bonded.

Figure 4:
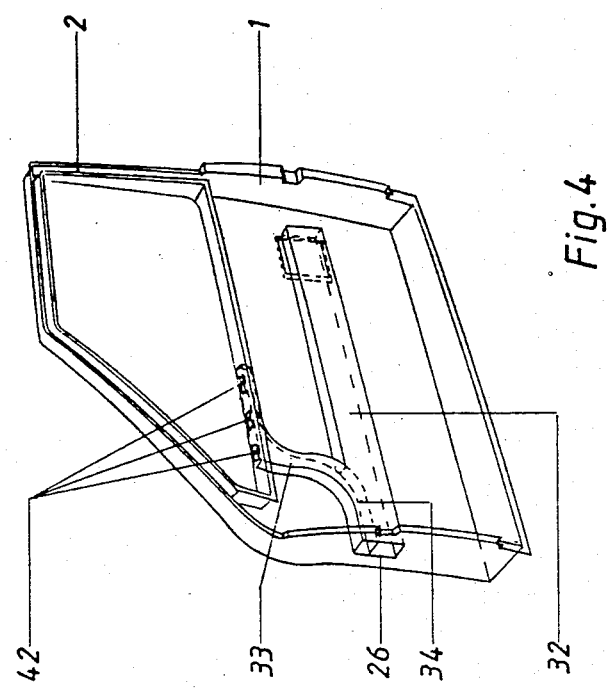
FIG. 4 is a view of the inner part of the door without the door outer part in front of it.

FIG. 4 shows an alternative door inner part 1 with window frame 2 which has the basic construction corresponding to FIGS. 1 and 3. This inner part can also be equipped with a reinforcing element 18 and can be supplemented by a door outer part 3 with a window pane 4 to form a complete door. FIG. 4 shows how the inner part 1 can be developed, for instance, with an air duct 32. The air duct 32 extends approximately horizontally from the forward end wall to the rearward end wall of the door inner part 1. The duct can be made of the same material as and be integral with the door inner part. The air duct 32 may communicate a connecting duct 33 which supplies fresh or hot air to defrost nozzle slits 42 for the window pane 4. The air duct 32 communicates at its front end with an inlet nozzle 26 at the door edge and at its rear end with an outlet opening which passes through the bottom of the door lower part 7. It is possible to develop the inlet nozzle 26 as a double nozzle and to divide the connecting duct 33 by a wall 34 from the air duct.

Figure 5:
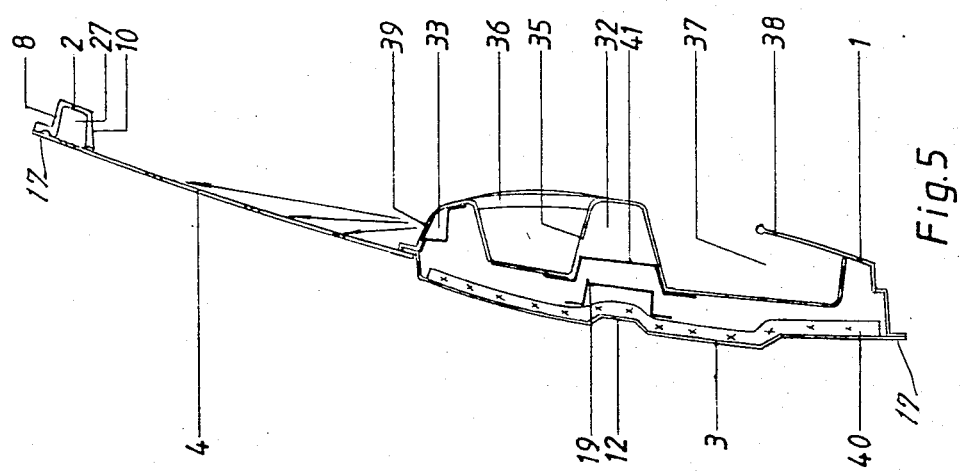
FIG. 5 is a section through a door in accordance with the invention, approximately along the section line V—V of FIG. 1.

FIG. 5 shows a cross-section through a preferred embodiment of a door in accordance with the invention. The door inner part 1 in this case has a particularly stable labyrinth-like shape with an arm rest 35 developed integrally on it, a door pull 36, and at least one pocket 37. The pocket 37 is defined on its front over a portion thereof by a web 38 which is developed with a thickened head.

FIG. 5 furthermore clearly shows the U-shaped development of the window frame cross-section and the closure by the window pane of the channel 27 thus formed. It also shows the outwardly projecting flange 17 around at least part of the periphery of the door inner part. In the embodiment shown in FIG. 5, the air duct 32 is developed between the arm rest 35 and the pocket 37 and is closed in the direction toward the door outer part 3 by a preshaped sheet 41 which is preferably bonded to the door inner part 1. Furthermore, FIG. 5 shows the air connecting duct 33 which supplies the defrost nozzles 39. In the embodiment shown in FIG. 5, the door may also be stiffened by a reinforcing element 18, the web 19 of which is shown. The door outer part 3 is covered on that surface which is not visible after assembly of the door with an anti-noise or silencing layer 40 which may be provided alternatively or in addition also on the rear of the door inner part 1.

In the front region of the window frame 2, air outlet openings 46 directed toward the window pane 7 are provided in the arm 10. In this case, the supply of air occurs because the arm 21 of the reinforcing element 18 is in open communication, at least in the upper region, with the air duct 32 of the web 19.

Although the present invention has been described in connection with a plurality of preferred embodiments thereof, many variations and modifications will now become apparent to those skilled in the art. It is preferred, therefore, that the present invention be limited not by the specific disclosure herein, but only by the appended claims.

What is claimed is:

1. A door for a car or the like vehicle, said door having:
   an inner section directed toward the inside of the car; the door inner section being formed of plastic said inner section comprising a generally box-shaped lower part, with an open side which opens toward the outside of the car; a window frame integral with said lower part of the door inner section; the window frame being comprised of arms extending up from the lower part of the inner section;
   said door having an outer section located outside the said inner section; the door outer section also being formed of plastic at its outer side, the door inner section being attached to the inner side of the door outer section;
   a window pane at the door outer section firmly attached to the arms of the window frame; the said arms of the window frame having a U-shaped cross-section with the open side of the U facing toward the door outer section, the window pane extending across the open side of the U and closing off the U for defining a stiffening structure thereby.

2. The door of claim 1, wherein the inner section lower part has a peripheral rim part at least at the bottom of the lower part; the rim part being bent toward the outer part of the door for helping to define the open box shape of the lower part of the inner section.

3. The door of claim 1, wherein the inner section is a single wall plastic molding; said window frame having a U-shaped cross-section, the said U-shaped cross-section of the window frame comprising a channel having an open side which opens toward the door outer section and is perpendicular to the general plane of the door inner section; said open side of said channel extending peripherally around the upper edge region of the inner section 4. The door of claim 3, further comprising a U-shaped cross-section transverse channel located approximately at the center of the door and extending across the door, generally from the front to the back.

5. The door of claim 4, wherein the outer section is assembled approximately parallel to the inner section for closing the channels of the inner section.

6. The door of claim 5, wherein the outer section together with the window pane also is a single wall plastic molding.

7. The door of claim 3, wherein the door inner section has a periphery around the lower part and the window frame; and at least part of this periphery includes a flange which projects outwardly.

8. The door of claim 1, further comprising a reinforcing element between the door inner section and the door outer section.

9. The door of claim 8, wherein the reinforcing element is comprised of a heat-stable and dimensionally-stable material.

10. The door of claim 8, wherein the reinforcing element extends into and along and partially around the channel of the window frame.

11. The door of claim 10, wherein the reinforcing element has a body of approximately H-shape, having a cross arm which extends generally front to back along the door inner section and beneath the window frame thereof.

12. The door of claim 11, wherein the reinforcing element has side legs which extend into and along and partially around the channel of the window frame and also are in the door inner section.

13. The door of claim 12, wherein the reinforcing element has side legs which are of U-shaped cross-section, and the U's of the side legs, on opposite sides of the reinforcing element, are opened toward each other;

the cross arm of the H-shaped reinforcing element is also of U-shaped cross-section with a channel, and the U of the cross arm opens toward the door outer part.

14. The door of claim 13, wherein the door outer section has an inwardly drawn portion which is shaped and positioned to engage in the channel of the cross arm of the reinforcing element.

15. The door of claim 11, wherein the reinforcing element is bonded to the door inner section.

16. The door of claim 8, wherein the door includes hinges along one side thereof and includes a lock on another side thereof, and the hinges and the lock are on the reinforcing element.

17. The door of claim 1, wherein the door outer section has an upper edge region having a groove therein for supporting the window pane and the window pane being supported in the groove.

18. The door of claim 17, wherein the window pane is bonded to the door outer section at the groove.

19. The door of claim 1, wherein both the door outer section and the window are of a transparent plastic material and are developed as a single unit of the same material.

20. The door of claim 1, wherein the door inner section has integral door components on the inside surface thereof which are formed by rib-like stiffening wall sections on the inward facing side of the door inner section.

21. The door of claim 1, further comprising an air duct between the door inner and outer sections, which duct is connectable with an air supply; the duct extending generally rearwardly along the door; an outlet from the duct and directed for blowing air against the window pane.

22. The door of claim 21, wherein the air duct is developed in the door inner section as a groove therein; and a separate sheet over the open outer side of the groove in the door inner part for closing off the air duct.

23. The door of claim 21, further comprising a reinforcing element between the door inner and outer sections; the air duct being in the reinforcing element, and the duct also including an outlet directed at the window pane.

24. The door of claim 1, wherein at least one of door inner section and outer section carries a noise-damping layer.

25. A door for a car or the like vehicle, said door having:

an inner section directed toward the inside of the car; said inner section comprising a generally box-shaped lower part, with an open side which opens toward the outside of the car; a window frame integral with said lower part of the door inner section; the window frame being comprised of arms extending up from the lower part of the inner section;

said door having an outer section located outside the said inner section; the door outer section also being formed of plastic at its outer side, the door inner section being attached to the inner side of the door outer section;

a window pane at the door outer section firmly attached to the arms of the window frame;

and a reinforcing element between the door inner part and the door outer part;

said reinforcing element extending into and along and partially around the channel around the window frame;

the reinforcing element having a body of approximately H-shape, having a cross arm which extends generally front to back along the door inner part and beneath the window frame thereof;

the reinforcing element having side legs which which extend into and along and partially around the window frame and also are in the door inner part;

and an air duct in the reinforcing element between the inner and outer door parts; the duct is connectable with an air supply; the duct extending generally rearwardly along the door;

the reinforcing element having a first one of the side legs extending above the cross arm thereof and the first leg is in open communication with the air duct for supplying air to the first leg;

an outlet opening from the first leg and the frame and directed for blowing air against the window pane.

* * * * *